Nov. 16, 1926.  
J. BERGE  
1,606,984  
INSTRUMENT MOUNTING  
Filed Nov. 8, 1924
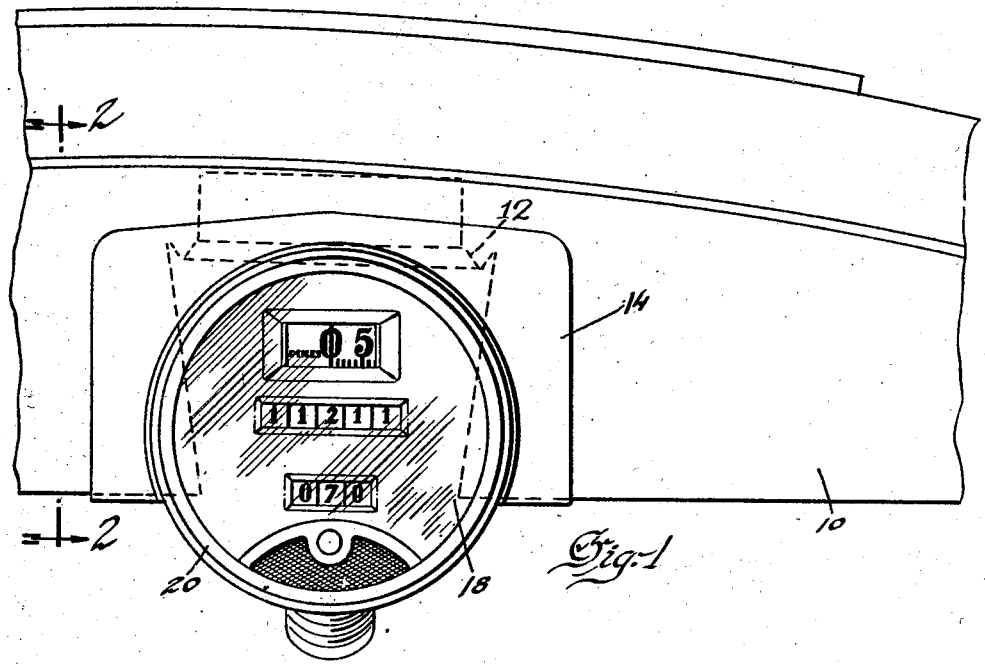
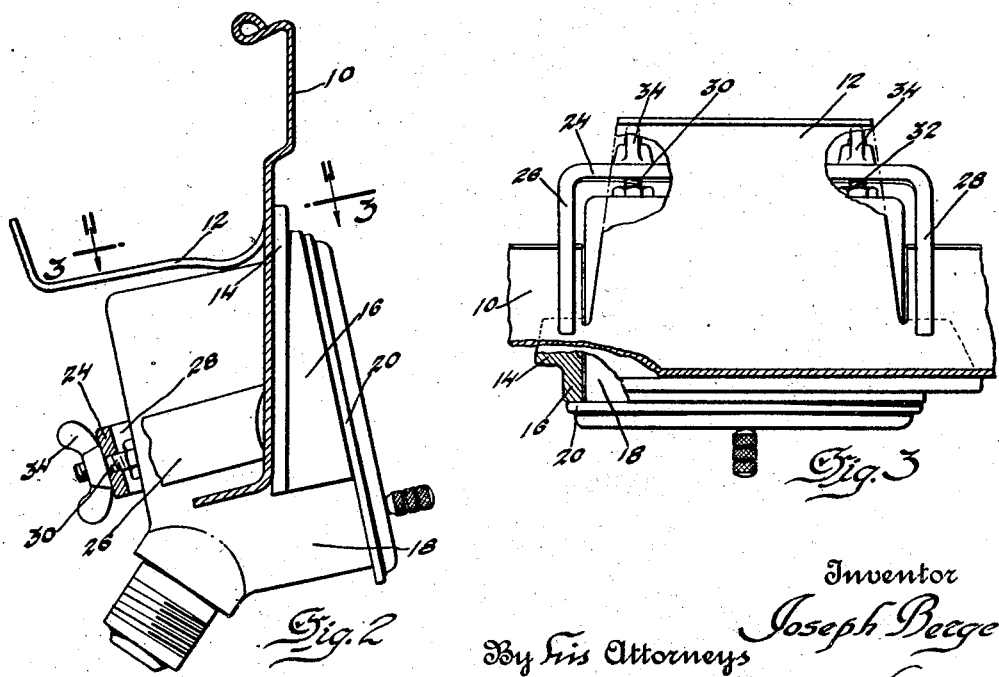
Inventor  
Joseph Berge  
By his Attorneys  
Blackmore, Spencer & Flint Patented Nov. 16, 1926.

1,606,984

UNITED STATES PATENT OFFICE.

JOSEPH BERGE, OF FLINT, MICHIGAN, ASSIGNOR TO GENERAL MOTORS CORPORATION, OF DETROIT, MICHIGAN, A CORPORATION OF DELAWARE.

INSTRUMENT MOUNTING.

Application filed November 8, 1924. Serial No. 748,642.

This invention relates to mounting instruments on the instrument board of an automobile, and is illustrated as an instrument board for a Ford having a novel mounting for a speedometer. An object of the invention is to provide a mounting which can readily be assembled in a service station, as distinguished from a factory installation, requiring only a few hack-saw cuts and eliminating the necessity for special tools.

In one desirable arrangement, a couple of saw cuts are made upwardly from the bottom of the instrument board, and the section between these cuts is removed, as for example by bending it backwardly and upwardly out of the way to leave a generally rectangular opening. The instrument is provided with an adapter engaging the front face of the instrument board over the opening, and clamping means engaging the back of the instrument board to clamp the instrument and adapter in place. It is desirable that the opening be of less width at the bottom than the top, and that the width at the bottom be less than the diameter of the speedometer.

Preferably the adapter is a separate member having a circular opening for the speedometer or other instrument, the opening extending below a horizontal diameter so that the adapter and instrument cannot be separated by radial movement, the instrument casing having a laterally-extending flange resting against the adapter around the opening. The clamping means may include a U-shaped member having legs engaging the back of the instrument board on opposite sides of the saw cuts, and threaded means engaging the instrument and the cross portion of the U-shaped member to clamp the instrument and adapter firmly against the front of the instrument board.

Thus the only operation required on the instrument board is a couple of saw cuts, which need not be at all accurate and the edges of which need not be finished, while only a couple of simple and inexpensive parts are required to clamp the instrument with its adapter firmly in a position concealing the opening in the instrument board.

One embodiment is shown in the accompanying drawings, in which:

Figure 1 is an elevation, from the driver's point of view, of part of the instrument board and instrument assembly;

Figure 2 is a vertical section on the line 2—2 of Figure 1, showing the instrument assembly in side elevation; and Figure 3 is a horizontal section on the line 3—3 of Figure 2, partly broken away to show the instrument assembly in top plan.

In this embodiment, the instrument board 10 is given a couple of upward hacksaw cuts defining a portion 12, which is bent backwardly and upwardly out of the way to leave a generally rectangular opening extending upwardly from the bottom edge of the instrument board. An adapter 14, shown as separate from the instrument casing, engages the front face of the instrument board 10 over the opening so formed. This adapter is shown with a flange 16 surrounding a circular opening for an instrument such as a speedometer 18, the opening extending below the horizontal diameter so that the instrument and adapter cannot be separated by radial movement,—i. e. so that the instrument cannot fall out of the adapter. The speedometer has a laterally-extending circular flange 20 engaging the front edge of flange 16 of the adapter.

Preferably the saw cuts diverge upwardly, portion 12 being trapezoidal in shape, and the width of the opening being at its bottom less than the diameter of the speedometer. Thus the instrument and its adapter cannot possibly fall out of the opening. This relationship appears clearly in Figure 3. It will be understood that the part 12 which is joined at its rear edge only to the instrument board serves when bent forwardly therefrom approximately at right angles as shown, as an effective reinforce against stresses tending to bend the board either forwardly or rearwardly.

The instrument and its adapter are clamped against the front face of the instrument board by clamping means, shown as including a U-shaped member 24 having legs 26 and 28 engaging the back of the instrument board on opposite sides of the rectangular opening. The ends of these legs are shown as cut out to form sharp corners digging into the back of the instrument board. Threaded studs 30 and 32 carried by the speedometer casing extend through openings in the cross portion of member 28 to receive wing nuts 34, the studs and nuts constituting threaded means engaging the instrument and the U-shaped member to clamp the instrument and its adapter firmly against the front face of the instrument board in which position the member 24, as will be understood, acts to reinforce the lower edge portion of the board 10.

It is not the intention to limit the scope of the invention to the exact construction described above, or otherwise than by the terms of the appended claims.

I claim:

1. An instrument assembly comprising, in combination, an instrument board having a generally rectangular opening extending upwardly from its lower edge, an instrument having a casing with a circular laterally-extending front flange, an adapter having a generally rectangular portion resting against the front face of the instrument board over said opening and having a circular opening extending below a horizontal diameter, the instrument being arranged in the circular opening with its flange engaging the front face of the adapter about the circular opening, and clamping means engaging the back of the instrument board and the back of the instrument and constructed and arranged to draw said flange toward the front face of said board to clamp the instrument and adapter in position thereon.

2. An instrument assembly comprising, in combination, an instrument board having a generally rectangular opening extending upwardly from its lower edge, an instrument having a casing and a generally rectangular laterally-extending adapter member resting against the front face of the instrument board over said opening, and clamping means engaging the back of the instrument board and including a U-shaped device having legs engaging the instrument board on opposite sides of the opening and threaded means engaging the instrument and the cross portion of the U-shaped device to clamp the instrument and adapter against the front of the instrument board.

3. An instrument assembly comprising, in combination, an instrument board having a trapezoidal opening extending upwardly from its lower edge, the bottom of the opening being narrower than the top, an instrument in the opening having a casing circular in outline and of greater diameter than the width of the bottom of the opening, and an adapter closing the opening around the instrument.

4. An instrument assembly comprising, in combination, a sheet metal instrument board having a portion connected to the remainder of said board at its rear edge only and bent forwardly to form a reinforce for said board and also to provide an opening extending upwardly from the lower edge thereof, and an instrument casing assembled in said opening.

5. An instrument board assembly comprising a sheet metal instrument board slitted upwardly from its lower edge at two points therealong, the metal between the slits being bent back to form a notch reinforced by said metal along its upper edge, an adapter positioned against the front face of said board about the notch, an instrument mounted in said adapter and projecting through the notch, and clamping means bridging said notch near the lower edge thereof to hold said instrument in place and to reinforce said board across the notch.

In testimony whereof I affix my signature.

JOSEPH BERGE.